Oct. 16, 1934.    K. E. LYMAN    1,976,792
ELECTRIC SHOCK ABSORBER
Filed Aug. 18, 1930    3 Sheets-Sheet 2
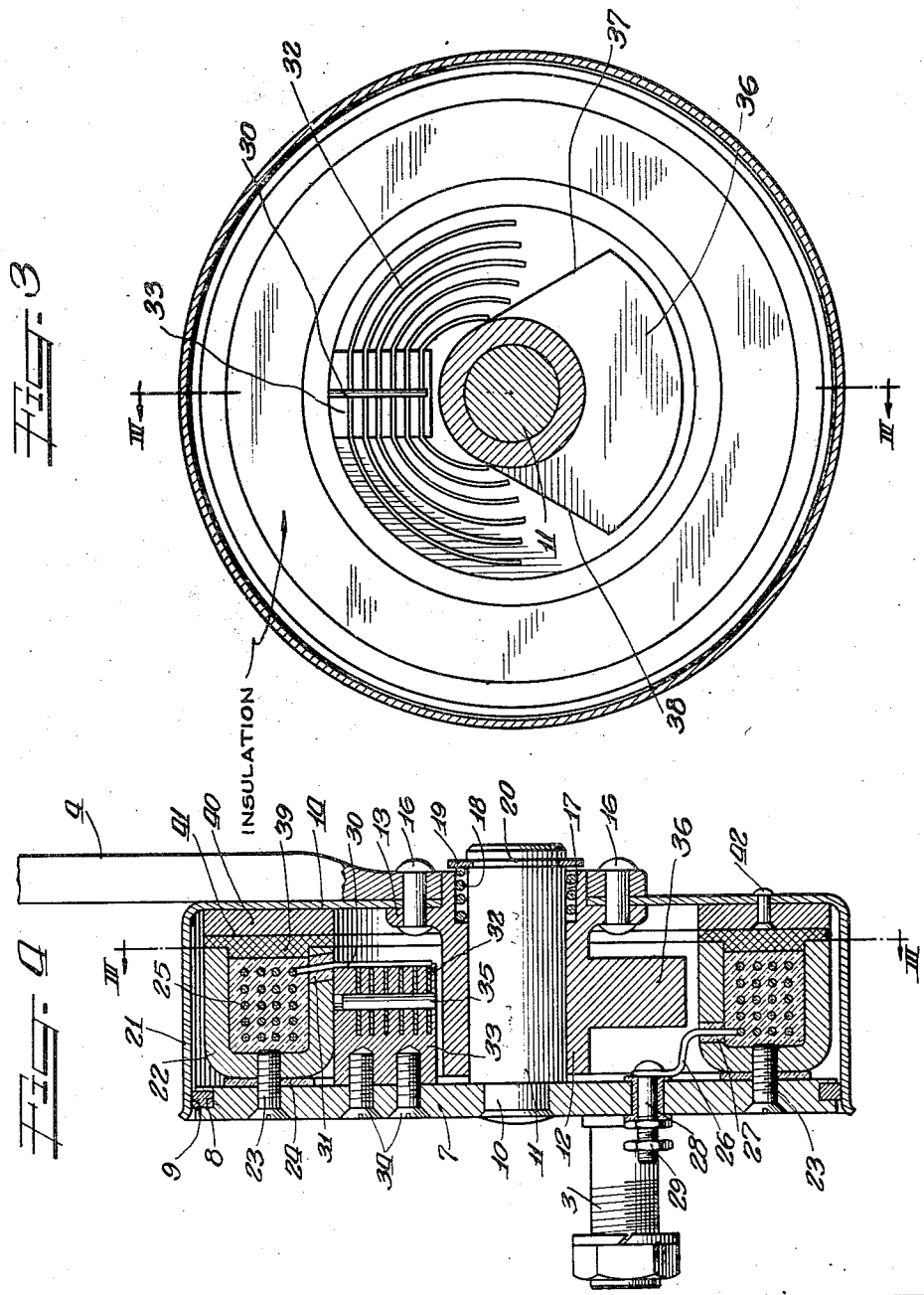
Inventor:
Kenneth E. Lyman.

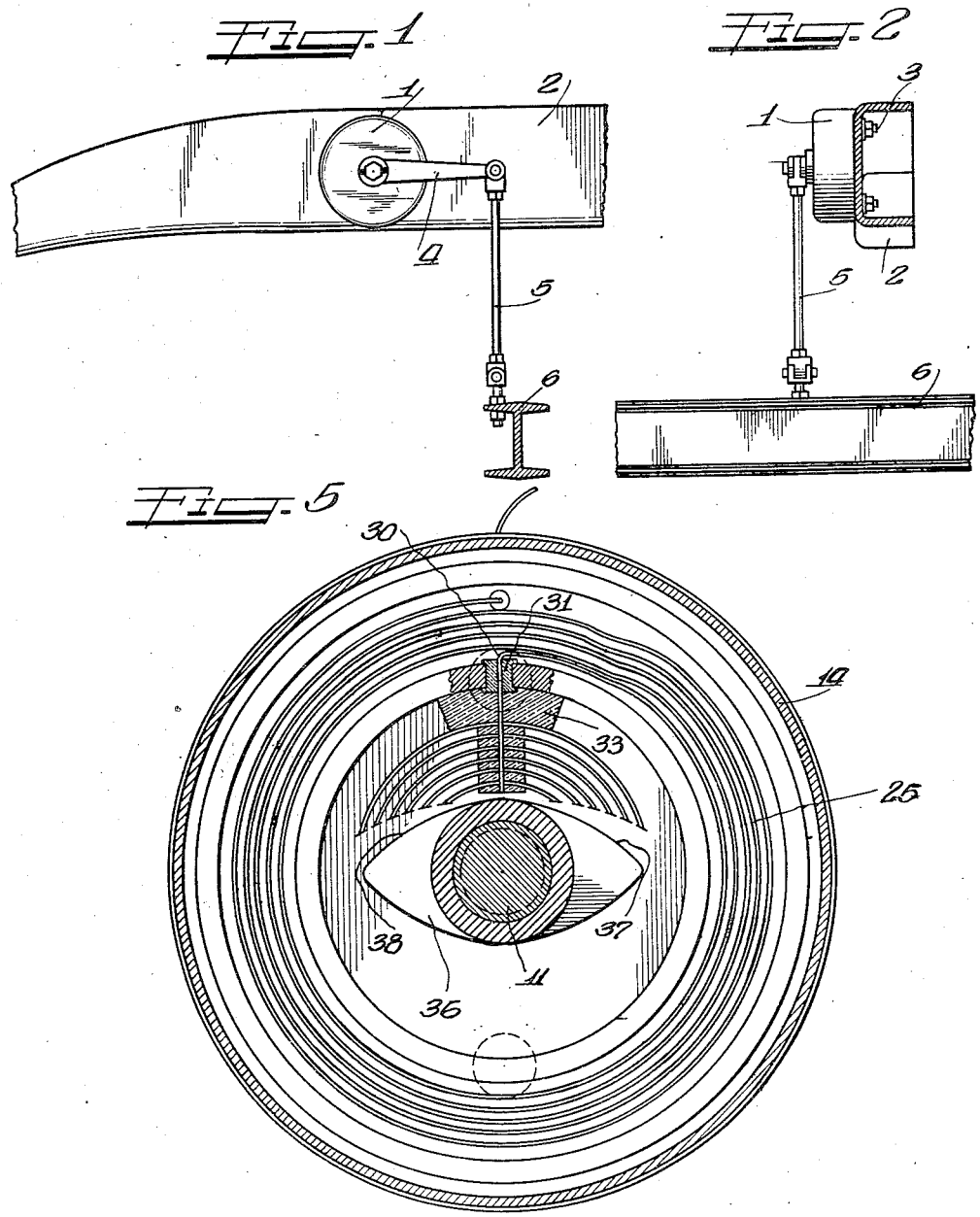

Oct. 16, 1934.  K. E. LYMAN  1,976,792
ELECTRIC SHOCK ABSORBER
Filed Aug. 18, 1930   3 Sheets-Sheet 3
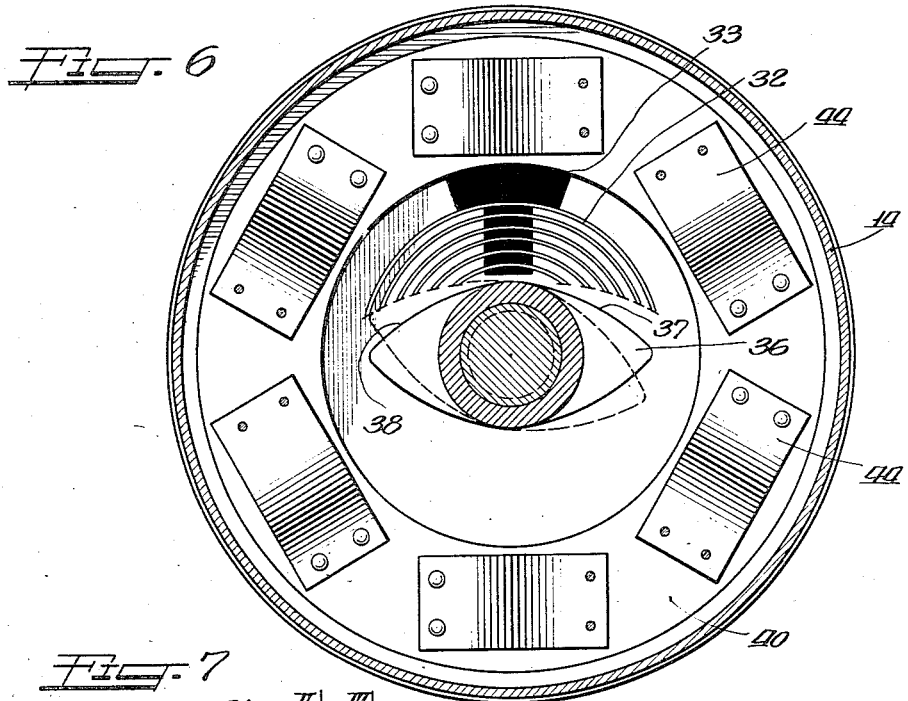
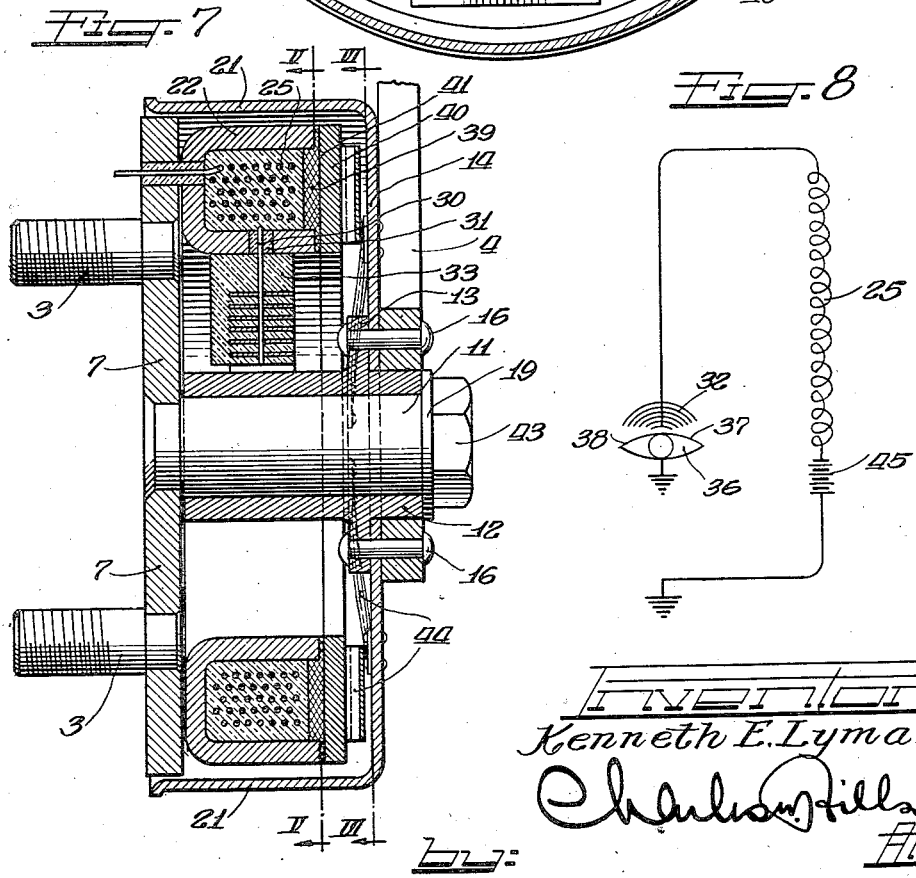

Patented Oct. 16, 1934

1,976,792

UNITED STATES PATENT OFFICE 1,976,792

ELECTRIC SHOCK ABSORBER

Kenneth E. Lyman, Rockford, Ill., assignor to Borg-Warner Corporation, Chicago, Ill., a corporation of Illinois Application August 18, 1930, Serial No. 475,911

7 Claims. (Cl. 188—130)

This invention relates to shock absorbers for automobiles and similar vehicles.

It is an object of this invention to provide an improved shock absorber which is adapted to increasingly resist the deflection of the suspension springs from normal position and decreasingly resist the return of the springs to normal position.

It is also an object of this invention to provide an improved shock absorber having an energy absorbtion capacity which is not varied by temperature changes.

It is a further object of this invention to provide an electrically operated shock absorber which is simple in design, dependable in operation, and economical to manufacture.

Other and further important objects of this invention will be apparent from the disclosures in the specification and the accompanying drawings.

The invention (in a preferred form) is illustrated in the drawings and hereinafter more fully described.

On the drawings:

Figure 1 is a fragmentary end elevational view showing a device embodying the feature of this invention in association with the chassis frame and axle of a vehicle.

Figure 2 is a fragmentary side elevational view partly in section to show the manner of mounting the device on the chassis frame.

Figure 3 is an elevational view partly in section showing the operative relationship of the elements for controlling the excitation of the device, taken substantially on line III—III of Figure 4.

Figure 4 is a diametric section showing the operative relationship of the movable and stationary elements of the device, taken substantially on line IV—IV of Figure 3.

Figure 5 is a view similar to that of Figure 3 and shows a modified form of the invention, parts being removed to show the coil, taken substantially on line V—V of Figure 7.

Figure 6 is an elevational view partly in section showing the manner in which the armature is resiliently mounted, taken substantially on line VI—VI of Figure 7.

Figure 7 is a view similar to Figure 4 which shows the modified form of the invention.

Figure 8 is a schematic diagram of the electrical circuit of the invention.

As shown on the drawings:

As illustrative of this invention there is generally designated at 1 a device embodying the features of this invention, which is secured to the side of the vehicle frame member 2 by suitable bolts 3. An operating lever 4, which is connected to the movable elements within said device, is pivotally secured at its outer end to a connecting rod 5 which is pivotally connected at its lower end to an axle 6 of the vehicle. It is therefore obvious that any relative vertical movement between the chassis frame 2 and the axle 6 will be transmitted to the internal mechanism of the device 1.

The bolts 3 are secured in any appropriate manner to a base 7, Figure 4, which is circular in form and provided with an outwardly opening circumferential groove 8 which serves as a seat for a gasket 9 which projects beyond the edge of the base for a purpose which will later be apparent. The base 7 is centrally apertured for receiving a contracted end 10 of a stub-shaft 11, which is peened over so as to rigidly secure the shaft to the base; said shaft projecting perpendicularly therefrom. A hub 12 is rotatably mounted on this shaft and provided with a flange 13 adjacent its outer end; a drum 14 and the operating lever 4 being secured to said flange by the rivets 16. The outer end of the hub is also provided with a groove 17 on its inner surface which communicates with the end of said hub and cooperates with the shaft to form a socket for receiving a compression spring 18 which surrounds the shaft and projects past the outer end of the hub. The inner end of this spring bears against the closed end of the groove and the outer end bears against a washer 19 which is secured in an annular groove 20 of the shaft. Obviously, the spring 18 will force the hub inwardly along the shaft; a sufficient amount of clearance having been provided for axial movement of the hub between the washer 19 and the base 7. The peripheral margin of the drum 14 is deflected towards the base to form a flange 21 which surrounds the base 7 and slidably engages the gasket 9, thereby forming a weather-proof housing for the internal mechanism of the device.

An annular magnet core 22 having a U-shaped cross-section is secured to the base 7 by a plurality of screws 23 which extend through the base and threadedly engage the magnet core. A ring 24 of insulating material is provided for suitably insulating the magnet core from the frame. A coil 25 for energizing the magnet core is disposed in the trough between the two legs of the magnet core and held therein by any appropriate sealing compound. An end 26 of the coil just described extends through an insulating bushing 27 which is secured in the inner leg of the magnetic core, and is connected to one end of a terminal screw 28 which is insulatingly secured in the base 7; suitable nuts 29 being provided for making the external electrical connection thereto. The other end 30 of the coil is brought out through a bushing 31 which is provided in the inner leg of the magnet core in the same manner as the bushing 27.

The end 30 of the coil winding is electrically connected to the intermediate portions of a plurality of segmental strips 32 of electrically resistant material which have their mid-portions seated in individual grooves formed in the end of a supporting member 33 of insulating material, which is secured to the base 7 by suitable screws 34 which extend through the base and threadedly engage an end of said support. A pin 35 extends through aligned apertures in said support and strips 32 and serves to hold the strips in their respective grooves.

With the strips mounted as just described, the opposite ends of the strips will be respectively positioned on each side of a vertical diameter through the shaft 11. A segmental cam 36, which is integrally formed on the hub 12, normally occupies a position symmetrical to said vertical diameter through the shaft, in which position the edges 37 and 38 thereof will respectively contact a free end of the innermost strip. If the cam is rotated in one direction, the edge 37 will successively engage one set of free ends of the strips, whereas if revolved in the opposite direction the edge 38 will successively engage the other set of free ends of the strip, thereby increasing as the cam is moved in either direction the number of electrical paths between the cam and the coil winding 25, with the result that as the number of electrical paths is increased the resistance will be decreased and more current will flow to the coil.

A friction plate 39 overlies the pole-faces of the magnet core 22 and is provided with a contact surface which forms an abutment for the contact surface of a movable friction plate 40 at 41. The friction plate 40 is secured to the drum 14 by rivets 42 and forms an armature which will be attracted toward the pole-faces of the magnet core, when the coil 25 is energized. This friction plate is normally held in surface contact with the friction plate 39 under the influence of the spring 18.

In the modified form of my invention in which like numerals designate like elements, the stub-shaft 11 is threaded at its outer end and provided with a nut 43 which cooperates with the washer 19 to hold the hub 12 on the shaft. In this case, however, no provision is made for axial movement of the hub along the shaft. The resilient mounting for the friction plate 40 is therefore provided by the use of a plurality of spring strips 44 having their ends riveted respectively to the friction plate and the drum. These springs serve the same purpose as the spring 18 in the preferred form of my invention. Also, in the modified form, the cam 36 is of slightly different shape and does not make contact with the innermost of the strips 32, when in the normal position. This arrangement permits "free centering" of the device. That is, the coil is not energized when the chassis frame and axle are only slightly moved relative to each other. The strips in this case are supported from the inner leg of the magnet frame rather than by the base as in the preferred form of my invention. The operation of both forms of my invention is the same.

It is contemplated that the device will be connected to the battery circuit of a vehicle as shown in the simplified schematic circuit diagram in Figure 8. Since the battery 45 of the vehicle is usually grounded at one terminal to the frame, it therefore follows that the cam 36 will be grounded, since it is secured directly to the chassis frame 2. The strips 32 as previously described are connected to the end 30 of the coil 25 and the other end 26 of this coil is brought out through the terminal 28. This terminal is connected to the un-grounded terminal on the battery 45, thus completing the electrical circuit. Although it is not shown in the drawings, it has been found desirable to complete the electrical circuit through the ignition switch of the vehicle, in order that the device will not produce a load on the car battery during the time when the engine is not operating.

The operation of the device is as follows:

Assuming the device to be connected to the relatively movable members of the vehicle as shown in Figure 1, with the lever 4 at the center position, the operative mechanism will be in the relationship shown in Figures 3 and 4, namely, the friction plate 40 will be in surface contact with the friction plate 39 due to the influence of spring 18, and the cam 36 will be symmetrically disposed on each side of the vertical center-line of the shaft 11, as shown in Figure 3. In this position the edges 37 and 38 will contact with the free end of the innermost of the strips 32, thereby causing a small amount of current to flow through the coil 25 and energize the magnet core 22, whereupon the friction plate 40 will be attracted towards the friction plate 39; the contact pressure between said plates being slightly increased over that due to the action of the spring 18. If the axle 6 of the vehicle is now moved towards the chassis frame 2, which will be the case when the vehicle passes over an obstacle in the road, the lever 4 will be moved upwardly, the cam 36 will be rotated, and the edge 37 thereof will successively contact the adjacent free ends of the strips 32. The number of ends contacted by this movement will be dependent upon the amount of the relative movement of the axle and the chassis frame. It is obvious, that as additional free ends are contacted, additional parallel paths will be inserted in the coil circuit, with the result that the resistance of the coil circuit is decreased and more current will flow to the coil, thereby increasing the magnetic pull of the magnet core. The friction plates will therefore operate to increasingly oppose the movement of said vehicle parts. Upon the rebound or return of said parts to normal position the action of the cam and strips will be just the reverse, namely, they will operate to cause less current to flow through the coil and thus decreasingly resist the return movement of the vehicle parts. The action of the device will be the same as just described when the chassis frame 2 and axle 6 are moved outwardly from their normal positions.

This invention, therefore, provides a shock absorber which is adapted to increasingly resist the deflection of the suspension springs from normal position and decreasingly resist the return of the springs to normal position; a device in which the energy capacity is not varied by temperature changes; and a shock absorber which is electrically operated, simple in design, dependable in operation, and economical to manufacture.

I am aware that numerous details of construction may be varied through a wide range without departing from the principles of this invention, and I therefore do not purpose limiting the patent granted thereon, otherwise than necessitated by the prior art.

I claim as my invention:

1. A shock absorber comprising a base having a projecting stub-shaft and adapted to be connected to one part of a vehicle, a stationary friction plate associated with said base, a rotatable drum having a central hub surrounding said shaft and adapted to be connected to a relatively movable part of the vehicle, a cam integrally formed on said hub, a second friction plate carried by said drum and arranged to make surface contact with said first friction plate, electrical means associated with said base operative to vary the contact pressure between said plates in proportion to its excitation, and means responsive to the movement of said cam for varying the excitation of said electrical means.

2. A shock absorber comprising a base having a projecting stub shaft and adapted for connection to one part of a vehicle, a stationary friction plate associated with said base, a rotatable drum having a central hub surrounding said shaft and adapted for connection to a relatively movable part of the vehicle, a cam on said hub, a second friction plate carried by said drum and arranged to make surface contact with first friction plate, electrical means associated with said base operative to vary the contact pressure between said plates in proportion to its excitation, a variable resistance in circuit with said means operable by the movement of said cam to vary the excitation of said means.

3. A shock absorber comprising a base having a projecting stub shaft and adapted for connection to one part of a vehicle, a stationary friction plate associated with said base, a rotatable drum adapted for connection to a relatively movable part of the vehicle and having a central hub surrounding said shaft, a second friction plate carried by said drum and arranged to make surface contact with said first friction plate, electrical means associated with said base and operative to vary the contact pressure between said plates in proportion to its excitation, a plurality of spaced strips of current carrying material having their mid-portions insulatingly secured to said base and connected to one terminal of said electrical means, and a cam on said hub having a normal position of rest and arranged to successively contact one set of corresponding ends of said strips when moved in one direction and the opposite ends when moved in the other direction.

4. A shock absorber comprising a base adapted for securement to one part of a vehicle body, a magnet core associated with said base, a coil and its circuit for magnetizing said core, a drum rotatably mounted on said base and adapted for connection to a relatively movable part of the vehicle, an armature carried by said drum and operatively asssociated with said core, a friction plate disposed between said core and armature and presenting an abutment surface, resilient means for maintaining said armature in engagement with said surface, and means in said circuit actuated by the rotation of said drum for varying the excitation of said coil.

5. A shock absorber comprising a base adapted for securement to one part of a vehicle body, an annular iron U-shaped core supported by said base with its legs in concentric relationship, a coil and its circuit associated with said core to magnetize the core when energized, a drum rotatably mounted on said base and adapted for connection to a relatively movable part of the vehicle, an armature carried by said drum disposed to be influenced by the magnetic action of said core, a friction plate disposed between said core and armature and presenting an abutment surface, resilient means to maintain the armature in engagement with said surface, and means in said circuit actuated by the rotation of said drum to vary the excitation of said coil.

6. A shock absorber comprising a base adapted for securement to one part of a vehicle body, an annular magnetic core of U-shaped cross section supported by said base with its legs in concentric relationship, a coil and its circuit for magnetizing said core, a drum rotatably mounted on said base and adapted for connection to a relatively movable part of the vehicle, an armature carried by said drum and operatively associated with said core, a friction plate disposed between said core and armature and presenting an abutment surface, resilient means for maintaining said armature in engagement with said surface, means in said circuit actuated by the rotation of said drum for varying the excitation of said coil, said means being disposed within the confines of said annular core.

7. A shock absorber comprising relatively movable parts adapted for respective connection to sprung and unsprung parts of a vehicle, electro-magnetic means to control the movement of said parts, and cam actuated means responsive to the movement of said parts to vary the action of said electro-magnetic means.

KENNETH E. LYMAN.